US006392999B1

United States Patent
Liu et al.

(10) Patent No.: US 6,392,999 B1
(45) Date of Patent: May 21, 2002

(54) CONFERENCING AND ANNOUNCEMENT GENERATION FOR WIRELESS VOIP AND VOATM CALLS

(75) Inventors: Chung-Zin Liu; Kenneth Wayne Strom, both of Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/515,482

(22) Filed: Feb. 29, 2000

(51) Int. Cl.$^7$ .................................................. H04J 3/12
(52) U.S. Cl. ......................... 370/260; 370/265; 455/416
(58) Field of Search ................................. 370/253, 260, 370/261, 265, 351, 352, 353, 400, 401, 526, 356, 354, 355, 357; 455/560, 561, 67.1, 428, 416, 401, 445; 379/93.26, 90.01

(56) References Cited

U.S. PATENT DOCUMENTS

| | | | | |
|---|---|---|---|---|
| 6,185,439 B1 | * | 2/2001 | Guerrero | 455/460 |
| 6,215,784 B1 | * | 4/2001 | Petras | 370/356 |
| 6,233,235 B1 | * | 5/2001 | Burke | 370/356 |
| 6,252,952 B1 | * | 6/2001 | Kung | 370/114 |
| 6,253,249 B1 | * | 6/2001 | Belzile | 709/249 |
| 6,259,691 B1 | * | 7/2001 | Naudus | 370/352 |
| 6,259,905 B1 | * | 7/2001 | Berkowitz | 455/401 |

* cited by examiner

*Primary Examiner*—Douglas Olms
*Assistant Examiner*—Ricardo M Pizarro
(74) *Attorney, Agent, or Firm*—Walter W. Duft

(57) ABSTRACT

A telecommunication system routes wireless-specific digital frames from a first wireless communication device across a data-oriented network, without vocoding, for information delivery to a second communication device while implementing multi-party conferencing and tone/announcement generating functionality. Tone and announcement generation services are provided while the call path retains the wireless-specific digital frame format between the first wireless communication device and the terminating gateway. When tones are generated by the first wireless communication device, signaling messages are sent directly to the terminating gateway vocoder to initiate the generation of full rate DTMF tones at the terminating network. When tones and announcements are sent to the first wireless communication device, a resource server, working together with a feature server, generates a wireless-encoded version of the tone or announcement. This wireless-encoded version is then sent to the first wireless communication device, where an audible version of the tone or announcement is produced. When multi-party conferencing is initiated, the first call is established via wireless-specific digital frame communication. The first call is placed on hold while the second call is completed using a digital wireline format (e.g., PCM). Through vocoding, the first call's connection is re-negotiated to match the digital wireline format of the second call. To complete the conference call, the two calls are combined in the conference circuit as a composite digital wireline traffic stream.

46 Claims, 6 Drawing Sheets

CONFERENCING AND ANNOUNCEMENT GENERATION FOR WIRELESS VOIP AND VOATM CALLS

CROSS-REFERENCE TO RELATED APPLICATIONS

This application relates to our previous application Ser. No. 09/371,385, filed on Aug. 10, 1999, and entitled METHOD FOR OPTIMIZING MOBILE WIRELESS COMMUNICATIONS ROUTED ACROSS PLURAL INTERCONNECTED NETWORKS (the '385 application), the contents of which are fully incorporated herein by this reference.

STATEMENT REGARDING FEDERALLY SPONSORED RESEARCH OR DEVELOPMENT

Not Applicable

BACKGROUND OF THE INVENTION

1. Field of the Invention

This invention relates to the integration of voice-oriented wireless communication networks (e.g., cellular telephone systems) and data-oriented networks (e.g., Internet Protocol (IP) and Asynchronous Transfer Mode (ATM) networks). More particularly, the invention concerns the use of a data-oriented network to transport real-time communications from a first wireless communication device for information delivery to a second communication device within the context of a wireless-specific communication domain, wherein wireless-specific digital frames are transported from the first wireless communication device to and across the data-oriented network for information delivery to the second communication device in order to minimize vocoding-related traffic delays. Still more particularly, the invention is directed to a system and method for providing multi-party conferencing and tone/announcement generating functionality while nominally operating within a wireless-specific communication domain.

2. Description of the Prior Art

In the '385 application referenced above, we disclosed a system and method for routing communication traffic between a first wireless communication device (e.g., a cellular telephone) and a second communication device (e.g., a cellular or wireline telephone) across a data-oriented network, such as an IP or ATM network. The first wireless communication device operates in a wireless network connected to the data-oriented network via an originating gateway. A terminating gateway provides access to the data-oriented network on behalf of the second communication device. In the disclosed system and method, the vocoding steps normally performed at the Base Station (BS)/Mobile Switching Center (MSC) in the wireless network, and at the originating gateway, are eliminated in order to improve call throughput efficiency and minimize transmission delays. Wireless-specific digital frames generated by vocoding circuitry in the first wireless communication device are transported as such through the BS/MSC, through the originating gateway, across the data-oriented network, and to the terminating gateway, without conversion. In this way, communication traffic originating at the first wireless communication device remains in the wireless-specific communication domain at least through the terminating gateway.

There are two considerations not discussed in the '385 application that arise when operating in a wireless-specific communication domain. The first relates to the issue of how to provide multi-party conferencing, and the second pertains to the question of how to provide tone and announcement generation functionality on behalf of (i.e., to and from) the first wireless communication device. Implementing these functions in a conventional telephone system carrying digital Pulse Code Modulation (PCM) traffic is done by combining PCM frames to provide conferencing and to generate and transport tones and announcements over the voice channel. This technique cannot be used when the traffic is carried as wireless-specific digital frames. Relative to conferencing, one cannot combine the wireless-specific digital frames in the same manner used to combine PCM traffic frames. Similar issues arise relative to tone and announcement generation and transport to and from the first wireless communication device. With respect to tones generated by the first wireless communication device, such as dual tone multi-frequency (DTMF) patterns, the tones are encoded using wireless vocoders and transmitted in a low bit rate voice format to the vocoder at the terminating gateway. Because the tones sent in this lower bit rate format are not as accurately rendered as those sent as PCM traffic, their intended receivers (i.e., voice mail systems, automated menus, etc.) may not recognize them reliably. With respect to tones and announcements played to the first wireless communication device to implement such features as call waiting, voice mail notification, limited service area, etc., the only available source of such audio information is a database of PCM encoded frames. These PCM frames cannot be inserted into a stream of wireless-specific digital frames when playback to the first wireless communication device is required.

Accordingly, there is a need in a communication system that includes a wireless network and a data-oriented network operating in a wireless-specific communication domain, for a system and method for implementing conferencing and tone/announcement generating functionality. What is required is a system and method that allows communication to occur substantially in the wireless-specific domain while providing the ability to implement multi-party conferences and to generate tones and announcements and transmit them to and from a wireless communication device.

SUMMARY OF THE INVENTION

A solution to the foregoing problem and an advance in the art is provided by a novel system and method for implementing conferencing and tone/announcement generation functionality in a communication system that includes a wireless network and a data-oriented network operating in a wireless-specific communication domain. In this wireless-specific communication domain, wireless-specific digital frames are generated by a first wireless communication device operating in the wireless network and carried across the data-oriented network, without vocoding, for information delivery to a second communication device.

The tone generation and announcement functions of the inventive system and method are provided while retaining the wireless-specific digital frame format for traffic carried over the wireless network and the data-oriented network. The tones and announcements include tones generated by the first wireless communication device and tones and announcements delivered to the first wireless communication device. For tones generated by the first wireless communication device, signaling messages are sent directly to the terminating gateway vocoder for generation of full rate DTMF tones at the terminating network. For tones and announcements to be sent to the first wireless communication device, a wireless-encoded version of each tone and announcement is generated by a resource server that works in conjunction with a feature server, both of which are local to the wireless network. The wireless-encoded version of the tone or announcement is sent to the first wireless communication device where a corresponding audible tone or announcement is produced.

In accordance with the conferencing functions of the inventive system and method, before a composite traffic stream for conferencing can be implemented, a call using wireless-specific digital frame traffic is established between the first wireless communication device in the wireless network and the second communication device, which is assumed to be located in a first terminating network connected to the data-oriented network via a terminating gateway. A second call from the first wireless communication device to a third communication device in a second terminating network (also connected to the data-oriented network) is established using digital wireline (e.g., PCM) traffic. The second and third communication devices may be served by the same or different terminating networks (i.e., the first and second terminating networks may be the same or different). Vocoding is performed relative to the first call to convert the traffic into the same digital wireline format (e.g., PCM) used by the second call. The conference call is then implemented by combining the two calls in the conference circuit located in the wireless network serving the first wireless communication device to form a composite digital wireline traffic stream.

In preferred embodiments of the invention, the wireless network includes an MSC or MSC/BS combination (if vocoding is performed at the BS) serving the first wireless communication device. The wireless network connects to the data-oriented network through a gateway which shall be referred to as the originating gateway because the first wireless communication device is assumed to be the call originator in the call scenarios described herein. The data-oriented network is a computer data network that routes information using a network layer datagram protocol such as IP, a lower level protocol such as ATM, or both. When serving a wireline communication device, the terminating network may include a terminating End Office (EO); when serving a wireless communication device, the terminating network may include a cellular network MSC or MSC/IBS combination. Tone/announcement generation on behalf of the first wireless communication device can be supported by either 1) a wireless feature server and a packet resource server within the MSC or 2) a local data network feature server and a packet resource server located outside of the MSC (i.e., within the originating gateway). Tone generation to the second communication device is additionally provided by an enhancement to the terminating gateway whereby tones are locally generated (i.e., at the terminating gateway) on behalf of the second communication device in response to tone generation signals from the first wireless communication device. Conferencing is supported by a PCM domain conferencing circuit and vocoders (or a conferencing circuit that converts digital wireless frames internally) that allow wireless-specific communications for two-way calls but which implement normal PCM vocoding for three-way calls.

A feature server supports tones generated by the first wireless communication device and tones and announcements transmitted to the first wireless communication device. The feature server function of the present invention can be implemented within an Access Manager (e.g., Executive Cellular Processor™ (ECP) from Lucent Technologies, Inc.), where the mobility and radio access server functions are also performed, or as a local data network (e.g., H.323 or System Initialization Protocol (SIP)) feature server located in the originating gateway. If the feature server is located in the ECP, the feature server will use an MSC-located packet-based resource server to generate tones and announcements in a wireless-encoded speech format (instead of PCM). A local wireless/data signaling gateway (located within the originating gateway) is also used to communicate signaling messages to and from the ECP feature server. This signaling gateway is configured to interpret feature commands usually sent by the ECP to a Digital Cellular Switch (DCS) as ECP-DCS messages, and to control a local IP switch to perform switching functions in the packet domain. The local wireless/data signaling gateway also provides interworking between the wireless routing and signaling protocol used by the ECP feature server and the data network specific (e.g., H.323 or SIP) signaling used in the data-oriented network, such that signaling messages may be exchanged between the ECP feature server and signaling resources of the data-oriented network. In the architecture that includes a local data network feature server located within the originating gateway, the feature server works in conjunction with a local data network resource server (also located within the originating gateway) to provide tones and announcements to the first wireless communication device. Under this configuration, the ECP/MSC manages wireless mobility and radio access functions, but not feature control. Feature control is provided by the local data network feature server. The local data network feature server also communicates signaling messages with signaling resources in the data-oriented network. Signaling between the ECP and a local IP switch is translated between data and wireless network signaling formats by a wireless/data signaling translator.

When a DTMF tone is generated at the first wireless communication device operating in a Global System for Mobile Communication (GSM) communication system, the first wireless communication device will be configured to recognize the tone and produce a tone generation signal. When a tone is generated at the first wireless communication device operating in a non-GSM system (e.g., TDMA or CDMA), the base station linked by radio control to the first wireless communication device will recognize the tone and produce a tone generation signal. For both GSM and non-GSM systems, the tone generation signal is sent as a signaling message to the terminating gateway, where a full rate DTMF tone is generated to the terminating network by the gateway vocoder.

Relative to tone and announcement signals sent to the first wireless communication device, the wireless-specific frame versions of the corresponding tones and announcements are stored in a database that resides in the local resource server. When the wireless-encoded tone or announcement is sent to the first wireless communication device, the audible tone or announcement is generated in the device's vocoder.

While implementing a conference call, PCM is the preferred format for the establishment of the second call. The format of the first call after conversion is also preferably PCM. The establishment of the second call, the conversion of the first call, and the bridging of the three devices to implement conferencing are preferably performed in accordance with the H.323 and G.711 ITU standards. After the conference bridge is completed, the wireless-to-PCM vocoding in the call path from the second communication device to the conference circuit can be done in either the DCS within the MSC or in the originating gateway, or both.

BRIEF DESCRIPTION OF THE DRAWING

The foregoing and other features and advantages of the invention will be apparent from the following more particular description of a preferred embodiment of the invention. as illustrated in the accompanying Drawing, in which.

DETAILED DESCRIPTION OF THE PREFERRED EMBODIMENT

Figure 1:
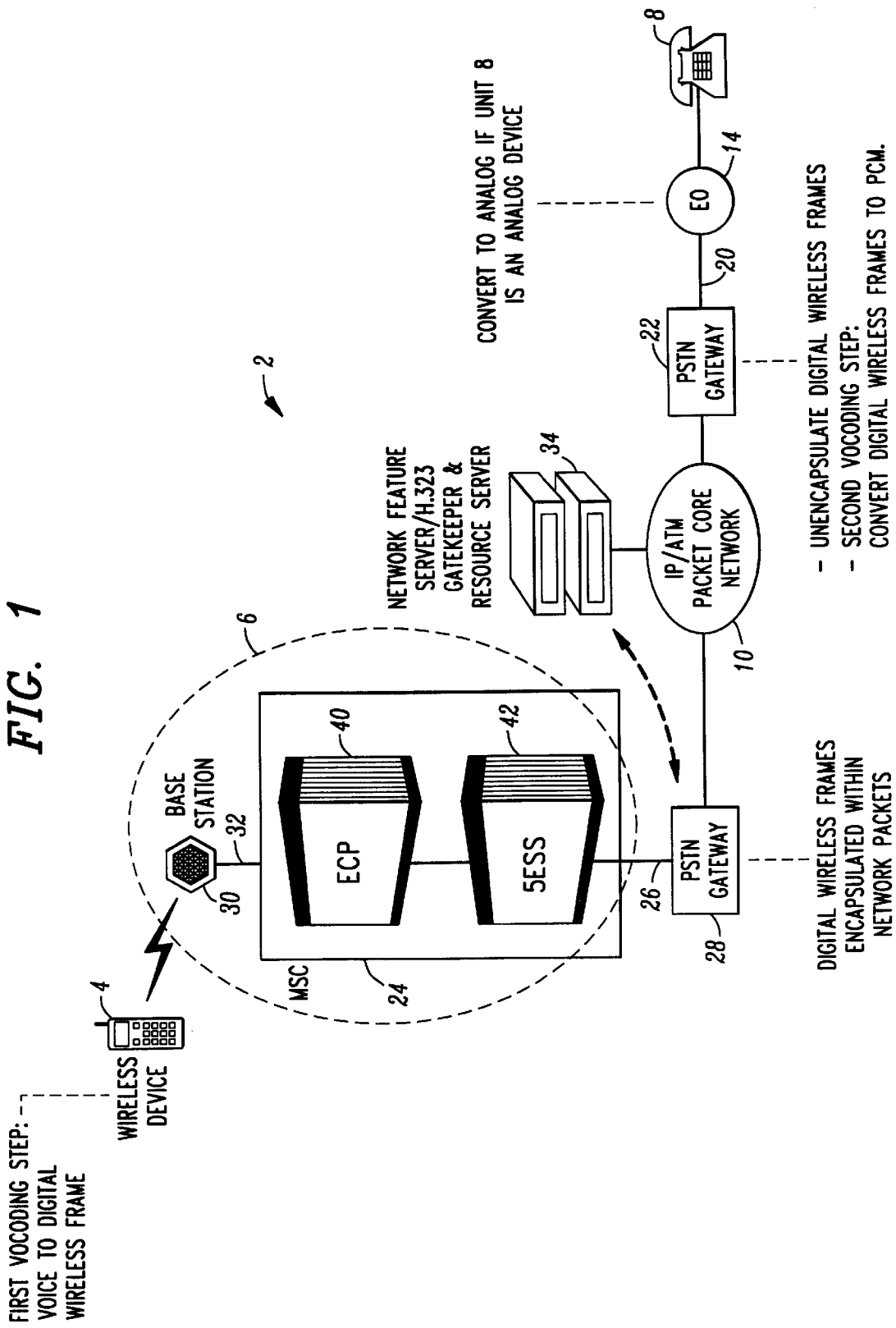
FIG. 1 is a block diagram showing relevant portions of a first exemplary telecommunication system for routing telephone calls from a wireless subscriber to a wireless or wireline subscriber in the PSTN across an interconnected data-oriented network while bypassing vocoding at the MSC/BS and at the originating gateway.

Turning now to the figures, wherein like reference numerals represent like elements in all of the several views, FIG. 1 illustrates an exemplary telecommunication system 2 for routing real-time information (e.g., voice traffic) between a first wireless communication device 4 residing in a wireless voice-oriented network 6 and a second (wireless or wireline) communication device 8 residing in the same or different network, via an intermediate data-oriented network 10 implementing a network layer protocol, such as IP, or a lower level protocol such as ATM, or both.

There are many architectures that could be used to support VoIP (or VoATM) on behalf of the first wireless communication device 4 and the second communication device 8. FIG. 1 illustrates one such architecture in which the End Office (EO) 14 is connected via T1 or E1 trunk group 20 to a data network gateway 22 and a Mobile Switching Center (MSC) 24 is connected via trunk 26 to a data network gateway 28. The gateways 22 and 28 reside as hosts on the data-oriented network 10. They provide VoIP (or VoATM) services on behalf of the users of the first wireless communication device 4 and the second communication device 8 and other wireline or wireless users (not shown) communicating over the data-oriented network 10.

During VoIP (or VoATM) communications between the first wireless communication device 4 and the second communication device 8, PCM traffic is routed from the EO 14 and from the MSC 24 to the respective gateways 22 and 28 for routing across the data-oriented network 10. When calls are originated by the first wireless communication device 4 and the second communication device 8, the usual intelligent network database resources of the Public Switched Telephone Network (PSTN) can be used to determine the routing of calls to the respective gateways 22 and 28 for transport over the data-oriented network 10.

The Ascend MultiVoice™ and the 7R/E Toll-Tandem™ gateway systems from Lucent Technologies Inc. represent two exemplary products that could be used to implement the gateways 22 and 28. The Ascend MultiVoicer™ and 7/E Toll-Tandem™ gateways are built in accordance with the H.323 specification, which is the recommended International Telecommunications Union (ITU) protocol standard for real-time multimedia communications and conferencing over and across existing infrastructures such as LAN/WANs, the Internet or any other topology where IP/ATM communication is supported.

The first wireless communication device 4, which is assumed to be a cellular telephone or personal communication system (PCS) device, communicates with a cell base station 30. It is further assumed that the first wireless communication device 4 is a digital device that includes a wireless-specific vocoder for converting analog voice input into digital wireless frames. By way of example, the input information could be converted into digital wireless frames using a TDMA-specific vocoding standard such as the Algebraic Code Excited Linear Predictive (ACELP) algorithm, or a CDMA-specific standard such as the Enhanced Variable Rate Codec (EVRC) algorithm. A Global System for Mobile Communication (GSM) vocoding algorithm could also be used.

As is known in the art, the above-described digital wireless frames typically include an information field containing speech coder bits (also known as a vector or codeword) corresponding to a voice sample of fixed duration (e.g. a 20 ms voice sample). The speech coder bits may be followed by an error correction field containing error correction bits. These fields are typically appended and/or prepended with additional physical framing bits to form composite frames. Persons skilled in the art will appreciate that the term "frame" is sometimes used in a somewhat different sense to refer to a repeating sequence of logical channels (e.g., time slots) assigned to multiple mobile units, with each logical channel (or a channel pair) containing the above-described bit fields for a specific mobile unit. To avoid ambiguity, the term "digital wireless frame" will be understood to represent an information unit containing at least the above-described information field containing speech coder bits (or bits that encode other forms of real-time information input, such as multimedia), and which may also include additional overhead bits, such as the above-described error correction bits and physical framing bits.

The digital wireless frames generated by the first wireless communication device 4 are received at the base station 30 and routed via a suitable connection, such as a broadband pipe 32 (carrying digital wireless frames for multiple wireless communication devices) to the MSC 24. Instead of performing a second wireless-specific vocoding operation in the MSC 24 (or at the base station 30) to decode the digital wireless frames and recover the voice information carried therein as PCM traffic, the received information is not converted to the usual PCM digital wireline format, but is forwarded in the wireless-specific domain to the first gateway 28. Thus, as per the '385 application, the wireless-specific vocoding normally performed at the MSC 24 (or the base station 30) to convert the digital wireless frames received from the first wireless communication device 4 into PCM traffic is eliminated. Instead, the digital wireless frames are placed directly onto the trunk 26 (with appropriate segmentation and multiplexing being performed as necessary to accommodate multiple users) and routed from the MSC 24 to the gateway 28. The gateway 28 will be referred to hereinafter as the originating gateway.

At the originating gateway 28, the digital wireless frames are received from the trunk 26. Again, however, the vocoding compression operation normally performed at the originating gateway 28 is eliminated, and the digital wireless frames are encapsulated within network packets (e.g., IP and/or ATM protocol data units) for transport across the data-oriented network 10. As is known in the art, the originating gateway 28 communicates with a data network feature server 34 to obtain the proper IP/ATM destination. The network packet-encapsulated digital wireless frames are then routed across the data-oriented network 10 from the originating gateway 28 to the gateway 22, which will be referred to as the terminating gateway. At the terminating gateway 22, the digital wireless frames are unencapsulated from the network packets. It is then that a second wireless-specific vocoding operation is performed (preferably by the gateway 22) to convert the digital wireless frames into PCM traffic.

The PCM traffic output by the terminating gateway 22 is routed across the trunk 20 to the EO 14, which serves as a terminating EO on behalf of the second communication device 8, representing the call terminating unit. At the EO 14, the PCM traffic is either routed in digital form to the second communication device 8, if the second communication device 8 is a digital device, or converted to analog form, if it is an analog device, such as a telephone. Alternatively, if the second communication device 8 is a wireless communication device, an MSC (not shown) would be substituted for the EO 14.

Components within the MSC 24 include an Executive Cellular Processor™ (ECP) 40 and a DCS 42. The DCS 42 may be implemented by an exemplary product such as the 5ESS-2000® digital switch (5ESS) from Lucent Technologies, Inc. The ECP 40 is responsible for call processing, mobility management, and radio access, and may also provide feature control (e.g., call forwarding, call waiting, and multiple way calls). If an existing PSTN network (not shown) co-exists with the data-oriented network 10, the ECP 40 (alone or in combination with intelligent network resources) can determine which network should be used for call routing according to subscriber or system provisioning data, or current network capacity. The switch 42 can simultaneously deliver a combination of wireline, wireless, voice, data, and video services. In FIG. 1, the switch 42 acts as a distribution unit, allowing movement of voice-related services and voice traffic from the wireless voice network 6 to the data-oriented network 10.

The data network feature server 34 includes a gatekeeper (e.g., H.323 or SIP) and a data network resource server. The data network feature server 34 provides toll/tandem features (e.g., network routing support). The gatekeeper within the data network feature server 34 provides call control services for data-oriented network endpoints. These services include address translation, admissions control, bandwidth control, and zone management. The gatekeeper's services may also include call control signaling, call authorization, bandwidth management, and call management.

When a call originates at the first wireless communication device 4, the dialed number is a conventional telephone number (e.g., in accordance with the E164 protocol). The E164 number is sent by the MSC 24 to an intelligent network resource (not shown) which returns, by way of example, routing information for routing the call to the originating gateway 28. In order to determine where to route the call in the data-oriented network 10, the originating gateway 28 forwards the E164 number to the data network feature server 34. A number lookup is then performed in an E164-Gateway mapping table provisioned in a gatekeeper database in the data network feature server 34. Routing information for routing the call, by way of example, to the terminating gateway 22, is returned to the originating gateway 28.

Figure 2:
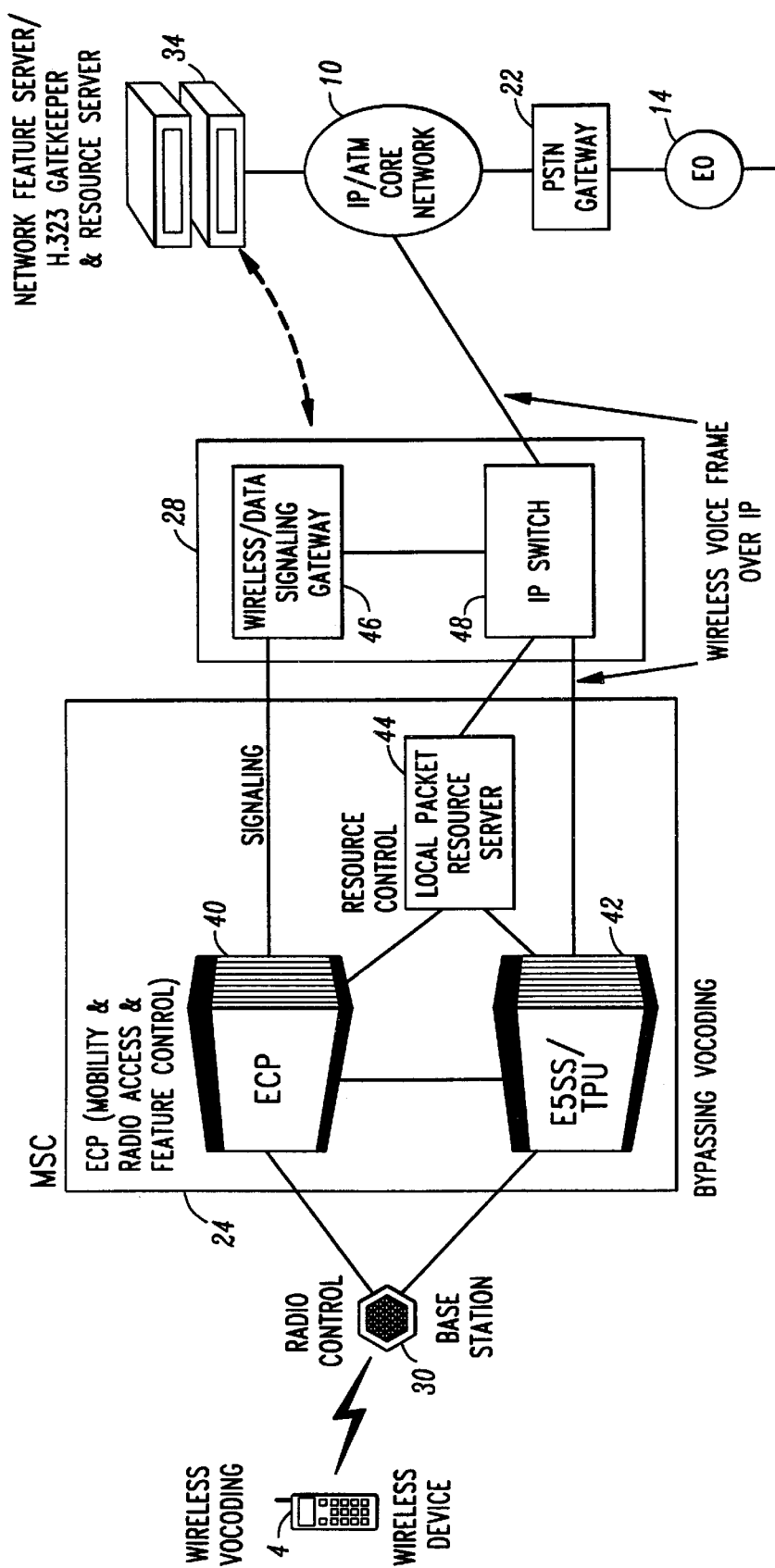
FIG. 2 is a block diagram showing a second exemplary telecommunication system that incorporates the present invention's method and system for providing tone and announcement generation and transport functionality by using a local packet-based resource server and an ECP with feature control.

Turning now to FIG. 2, a first detailed embodiment of the invention is shown that provides local feature server functions for wireless VoIP (or VoATM) applications while ensuring backward compatibility with existing wireless networks. An ECP 40 includes mobility, radio access and feature control functions, and a DCS 42 contains a conventional Traffic Processing Unit (TPU). Among other things, the ECP 40 communicates control messages to a local packet-based resource server 44, and exchanges signaling messages with a wireless/data signaling gateway 46. The wireless/data signaling gateway 46 interprets the ECP 40's wireless network feature commands (usually sent by the ECP 40 to the DCS 42 as ECP-DCS messages) and instructs an IP switch 48 to perform switching functions in the packet domain. Signaling information may also be passed between the ECP 40, the wireless/data signaling gateway 46, and signaling resources in the data-oriented network 10. The wireless/data signaling gateway 46 interworks between the ECP 40's wireless network routing and signaling information and the signaling (e.g., H.323 or SIP) used in the dataoriented network 10. The wireless/data signaling gateway 46 also supports local gatekeeper functions in order to communicate with the network gatekeeper 34 in the data-oriented network 10. The configuration in FIG. 2 differs from a wireline PSTN/H.323 gateway in that the wireless/data signaling gateway 46 uses direct signaling interworking between the wireless and data signaling (e.g., H.323 or SIP) formats and direct forwarding of wireless voice packets with no additional vocoding.

As described in relation to FIG. 1, digital wireless frames generated by the first wireless communication device 4 are transmitted to the BS 30, where they are routed in succession to the MSC 24, the originating gateway 28, the data-oriented network 10, the terminating gateway 22, the EO 14 and the second communication device 8. Because the digital wireless traffic is encoded speech rather than PCM, the local packet-based resource to server 44, as well as the terminating gateway 22, are enhanced to support the features that require tones and announcements. For DTMF tones sent from the first wireless communication device 4, signaling messages are generated (either by the first wireless communication device 4, when the first wireless communication device 4 is operating in a GSM system, or by the BS 30, when the first wireless communication device 4 is operating in a non-GSM system). In the architecture shown in FIG. 2, these signals are sent to the IP switch 48 via the ECP 40 and the wireless/data signaling gateway 46. The IP switch 48 routes the signaling traffic across the data-oriented network 10 to the terminating gateway 22. At the terminating gateway 22, full rate DTMF tones are generated by the vocoder in that unit and sent to the second communication device 8. An exemplary call during which the first wireless communication device 4 initiates tone generation is described in Example 1 below.

When tones need to be sent to the first wireless communication device 4 to implement features such as call waiting, voice mail notification, limited service area, etc., the local packet-based resource server 44 stores wireless-encoded versions of tones and cadences in its database and places these in the digital wireless frame traffic stream for transmission to the first wireless communication device 4 when instructed to do so by the ECP 40. The first wireless communication device 4, in turn, generates the appropriate audible tone in its vocoder. An exemplary call during which a tone pattern is sent to the first wireless communication device 4 is described in Example 2 below.

Announcements sent to mobile users are managed in a similar way. The local packet-based resource server 44 stores wireless-encoded versions of the announcements in its database and sends these to the first wireless communication device 4 upon instruction from the ECP 40. When the wireless-encoded version of an announcement is received at the first wireless communication device 4, the usual vocoding is performed and the device generates the audible announcement.

Figure 3:
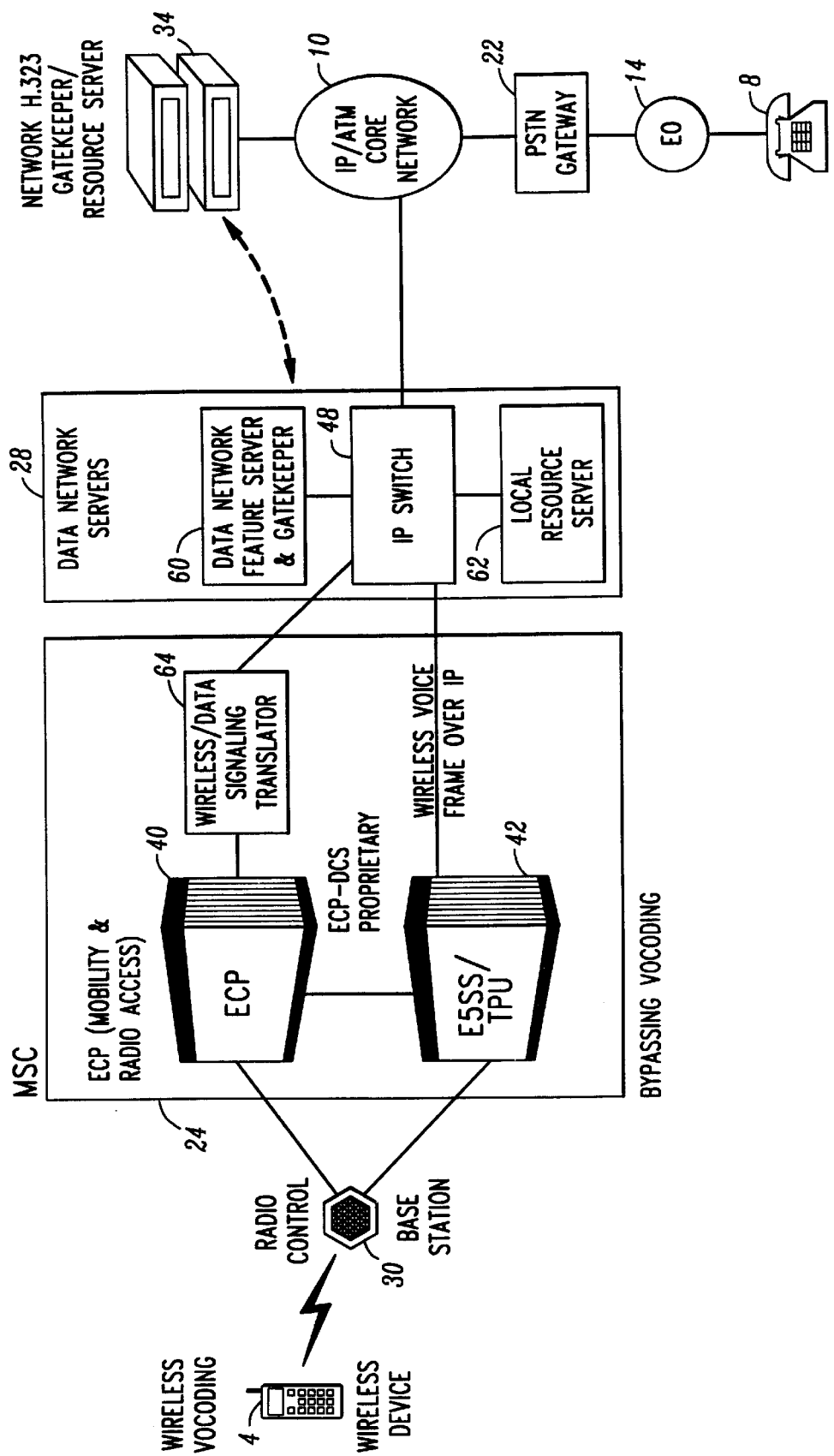
FIG. 3 is a block diagram showing a third exemplary telecommunication system that incorporates the present invention's method and system for providing tone and announcement generation and transport functionality by using a local data network feature server and a local data network resource server.

Turning now to FIG. 3, a second embodiment of the invention is shown that provides feature server functions to wireless VoIP (or VoATM) users without utilizing ECP-based feature control. Instead, a local data network feature server 60 provides feature control in association with a local data network resource server 62 and the IP switch 48. A wireless/data signaling translator 64 located in the MSC 24 is also provided to provide translation of message traffic flowing between the ECP 40, which uses a wireless messaging format, and the IP switch 48, which uses a data-oriented network messaging format, such as H.323 or SIP. As in the configuration described above in relation to FIG. 2, digital wireless frames generated by the first wireless communication device 4 are transmitted in succession to the BS 30, the MSC 24, the originating gateway 28, the data-oriented network 10, the terminating gateway 22, the EO 14, and finally the second communication device 8.

As described above in relation to FIG. 2, when DTMF tones are sent from the first wireless communication device 4, signaling messages are used to avoid the inaccuracies inherent in tones sent at lower bit rates. As described above, these signaling messages are generated by the first wireless communication device 4 (when operating in a GSM system) or by the BS 30 (when operating in a non-GSM system). In the architecture shown in FIG. 3, these signals are sent to the IP switch 48 via the ECP 40 and a wireless/data signaling translator 64. From the IP switch 48, the signaling traffic is routed across the data-oriented network 10 to the terminating gateway 22, where full rate DTMF tones are generated by its vocoder and sent to the second communication device 8. Such a call path is further illustrated in Example 1 below.

The local data network resource server 62 works with the local data network feature server 60 to provide tones and announcements to the first wireless communication device 4 as described above relative to FIG. 2. Thus, to manage tones and announcements sent to the first wireless communication device 4, the local data network resource server 62 stores wireless-encoded versions of the tones and announcements in a database. When a tone or announcement is needed, the local data network resource server 62 retrieves from its database one of these stored wireless-encoded versions of the tone or announcement and places it in the digital wireless frame traffic stream for transmission to the first wireless communication device 4. The first wireless communication device 4 then generates the corresponding audible tone or announcement in the device's vocoder. Example 2 below illustrates the path of a call that sends a tone pattern to the first wireless communication device 4.

Following are examples that further illustrate the tone and announcement generating functions of the invention:

EXAMPLE 1

Assume that a user of a first wireless communication device 4 calls a second communication device 8 located in a call center. Upon connection with the call center, the caller is presented with an automated menu system whose choices require a DTMF tone to initiate an event (e.g., play an informational message, route the call to a voice mail system, present another level of menu options, etc.). The required DTMF tones correspond to keys on the keypad of the first wireless communication device 4. To select an option from the menu system, the user first presses the appropriate key on the first wireless communication device 4 and generates a tone. When operating in a GSM system, the first wireless communication device 4 recognizes the tone and generates a signaling message that identifies the tone. This signaling message is then sent over a radio interface to the BS 30. If the first wireless communication device 4 is operating in a non-GSM system, the tone generated at the first wireless communication device 4 is sent as voice traffic over a radio interface to the BS 30. Here, the tone is recognized and a signaling message that identifies the tone is generated. In both the GSM and non-GSM configurations, the signaling message is transmitted from the BS 30 to the ECP 40. In the configuration shown in FIG. 2, the ECP 40 sends the signaling message to the wireless/data signaling gateway 46, which translates the signal from a wireless network format to a data-oriented network compatible format. The wireless/data signaling gateway 46 then places the signal onto the data-oriented network 10 via the IP switch 48. In the configuration shown in FIG. 3, the ECP 40 transmits the signaling message to the IP switch 48 via the wireless/data signaling translator 64 (which translates the signal from a wireless messaging format to a data-oriented network format). The IP switch 48 then sends the translated signal as a signaling packet to the data-oriented network 10. Under both architectures (shown in FIGS. 2 and 3), the data-oriented network 10 transports the signaling message to the terminating gateway, where a vocoding operation generates the full rate DTMF tone that corresponds to the signal. From the terminating gateway, the DTMF tone is sent to the EO 14. The EO 14 then sends the DTMF tone to the second communication device 8, where the tone is recognized and the associated menu-specified event is initiated.

EXAMPLE 2

Assume that the first wireless communication device 4 has a call waiting feature activated and is engaged in a call to a device other than the second communication device 8. A user of the second communication device 8 originates a call to the first wireless communication device 4 over the data-oriented network 10. During call setup to the IP switch 48, the switch makes a call terminating feature request query for instructions on how to handle the call. In the architecture shown in FIG. 2, this query is a signaling message sent to the wireless/data signaling gateway 46, which performs translation and then forwards the signaling message to the ECP 40 for feature control processing. Under this configuration, the ECP 40 determines that the first wireless communication device 4 has call waiting activated and sends a signal instructing the local packet-based resource server 44 to insert a tone pattern packet into the digital wireless frame traffic stream. The local packet-based resource server 44 retrieves the proper wireless-encoded version of the tone pattern from its database and forwards it to the DCS 42 to be inserted into the traffic stream. In the case of the configuration shown in FIG. 3, the gateway 28 includes the local data network feature server 60 and the local data network resource server 62 (instead of a wireless/data signaling gateway) interacting with the IP switch 48. When the IP switch 48 under the FIG. 3 configuration generates a signal requesting call feature support, the message is sent to, and processed by, the local data network feature server 60. The local data network feature server 60 then sends a command through the IP switch 48 to prompt the local data network resource server 62 to insert a tone pattern into the traffic stream. The local data network resource server 62 retrieves the proper encoded version of the call waiting tone pattern from its database and inserts it into the traffic stream at the IP switch 48. From the IP switch 48, the traffic with the encoded tone pattern is sent to the DCS 42. Under both the FIG. 2 and FIG. 3 architectures, the encoded tone pattern is sent from the DCS 42 to the BS 30. The BS 30 sends the encoded tone pattern over the air interface to the first wireless communication device 4, where a vocoding operation generates an audible call waiting tone pattern.

Figure 4:
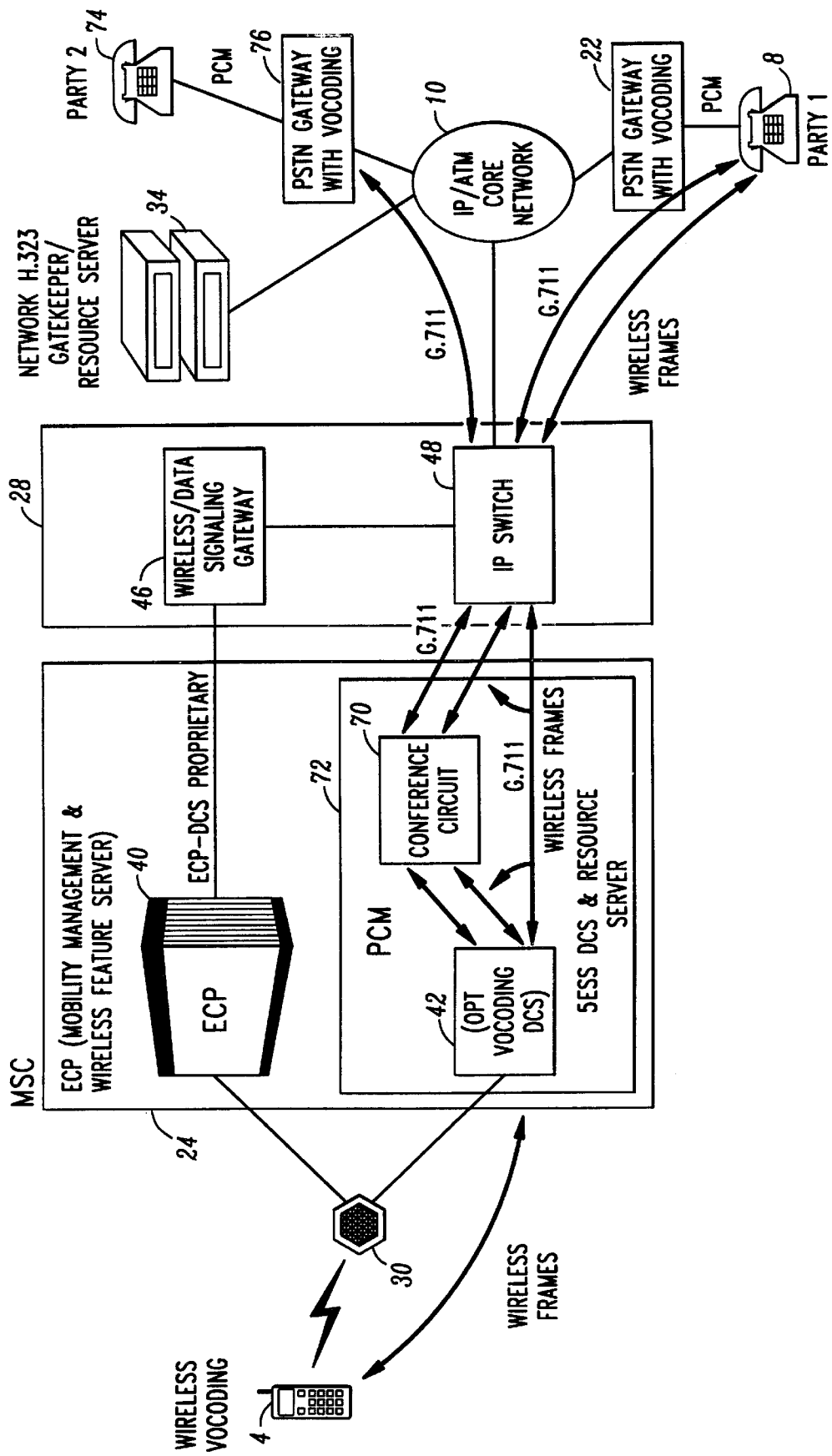
FIG. 4 is a block diagram showing a fourth exemplary telecommunication system that incorporates the present invention's method and system for providing conference bridging by using vocoding performed at a Digital Cellular Switch.

Turning now to FIG. 4, a third embodiment of the invention is shown that implements conference bridging for wireless VoIP (or VoATM) users without using data-oriented network wireless-frame transmission during conferencing. In a manner similar to the process described above in relation to FIG. 1, the initial call within a multiple way conference originates at the first wireless communication device 4 and is established using digital wireless frames with vocoder bypassing. Two-party calls are routed from the first wireless communication device 4 to the BS 30, the MSC 24, the originating gateway 28 (which contains the wireless/data signaling gateway 46 and the IP switch 48 of FIG. 2), the data-oriented network 10 (where network routing is supported by the data network resource server 34), and the terminating gateway 22. The calls are terminated at the second communication device 8. The call paths in a multi-way conference call utilize a conference circuit 70 located in a DCS/resource server 72. To implement a conference call, the user of the first wireless communication device 4 is assumed to make a first call to a first party via VoIP with vocoder bypassing. The first party uses the second communication device 8, which is linked to the data-oriented network 10 via the gateway 22. The first party is placed on hold as the user of the first wireless communication device 4 makes a second call to a second party who is using a third communication device 74. The third communication device 74 is linked to the data-oriented network 10 via a gateway 76. Unlike the first call, the connection to the second party is established via PCM vocoding at the DCS 42 and via a PCM conference bridge at the conference circuit 70 within the MSC 24 using H.323 and G.711 (64 kbps coding over IP) standards. While the first call is still on hold, the connection to the first party is re-negotiated to G.711 speech coding using H.323 procedures. When the second party has been added and the first call connection has been re-negotiated, the conference circuit 70 bridges the three parties via G.711. After conference bridging, wireless-to-PCM vocoding is performed in the DCS 42 for the call path between the first party's communication device 8 and the conference circuit 70 for traffic in both directions.

Figure 5:
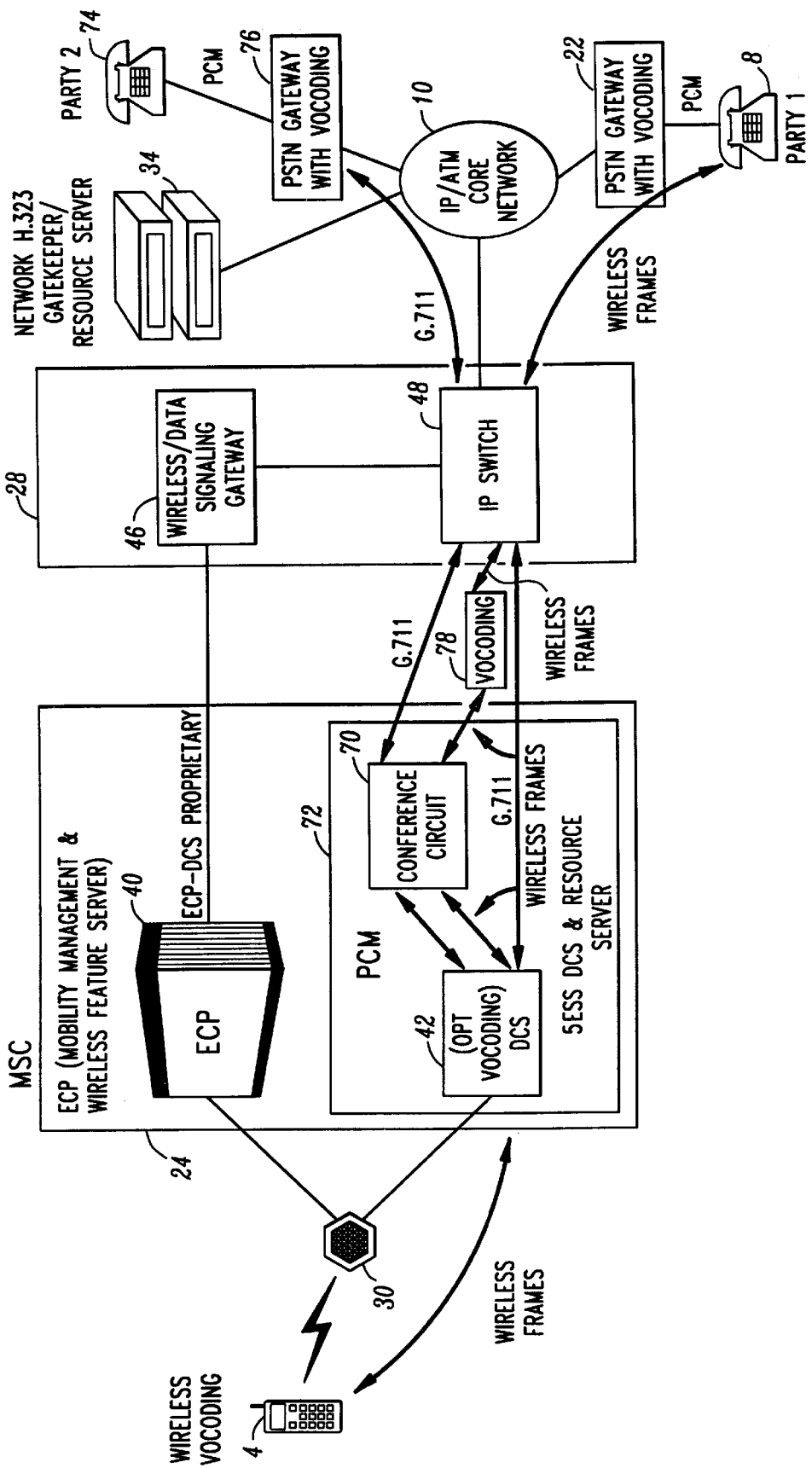
FIG. 5 is a block diagram showing a fifth exemplary telecommunication system that incorporates the present invention's method and system for providing conference bridging by using vocoding performed at a Digital Cellular Switch and at a gateway.

Turning now to FIG. 5, a fourth embodiment of the invention is shown that implements conference bridging for wireless VoIP (or VoATM) users with data-oriented network wireless frame transmission continuing during conferencing. The architecture and the conference bridging process shown in FIG. 5 match the system shown in FIG. 4, except that after conference bridging, PCM-to-wireless vocoding and wireless-to-PCM vocoding for the call path between the second communication device 8 and the conference circuit 70 is performed at the vocoder 78 (located either in the gateway 22 or the MSC 24). Thus, traffic leaving the conference circuit 70 that is bound for the second communication device 8 is converted from PCM to wireless format. Conversely, traffic bound for the conference circuit 70 from the second communication device 8 is converted from wireless to PCM format.

Figure 6:
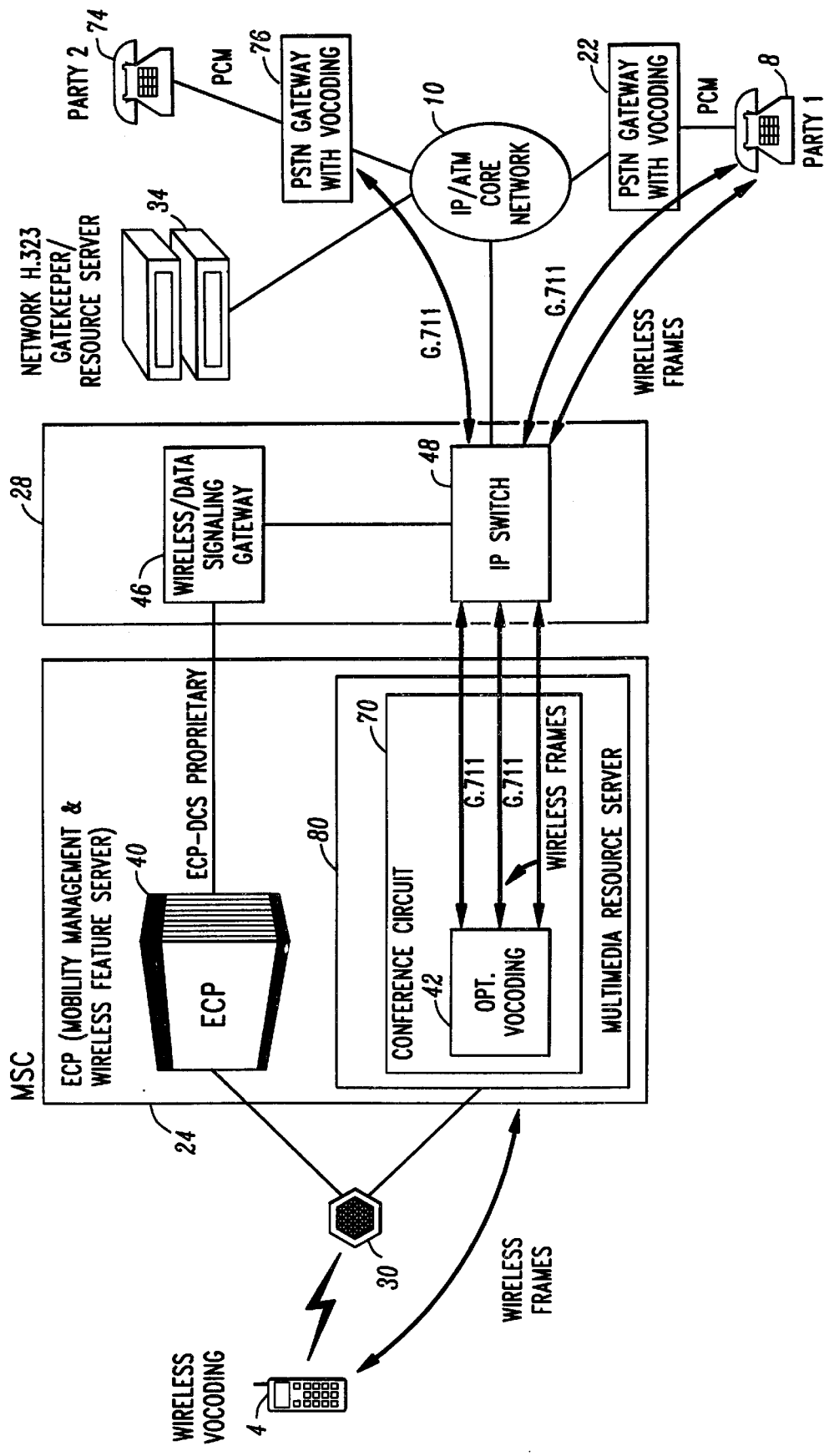
FIG. 6 is a block diagram showing a sixth exemplary telecommunication system that incorporates the present invention's method and system for providing conference bridging by using vocoding performed within a conference circuit.

Turning now to FIG. 6, a fifth embodiment of the invention is shown that implements conference bridging for wireless VoIP (or VoATM) users. The components and the conference bridging process shown in FIG. 6 match the system shown in FIG. 4, except that the conference circuit 70 performs the vocoding of digital wireless frames internally. Furthermore, the conference circuit 70 is located within a Multimedia Resource Server (MMRS) 80, instead of the DCS/Resource Server 72 shown in FIG. 4. Alternatively, a conference circuit 70 located in an MMRS 80 can internalize the twin vocoders shown in FIG. 5.

Accordingly, a method and system for providing multi-party conferencing and tone/announcement generating functionality in a communication system operating in the wireless-specific domain have been described. While various embodiments have been disclosed, it should be apparent that many variations and alternative embodiments could be implemented in accordance with the invention. It is understood, therefore, that the invention is not to be in any way limited except in accordance with the spirit of the appended claims and their equivalents.

What is claimed is:

1. In a telecommunication system routing wireless-specific digital frames from a first wireless communication device in a wireless network across a data-oriented network for information delivery to a second communication device, a method for implementing multi-party conferencing, comprising the steps of:

establishing a first call between the first wireless communication device and the second communication device using a wireless-specific digital frame transmission mode to communicate across said data-oriented network;

establishing a second call between the first wireless communication device and a third communication device using a PCM frame transmission mode to communicate across said data-oriented network;

routing said first and second calls through a conference circuit;

converting said first call from said wireless-specific frame transmission mode to said PCM frame transmission mode for communication through said conference circuit; and combining said first call and said second call in said conference circuit to effect conferencing.

2. A method in accordance with claim 1 wherein said data-oriented network in said step of establishing said first call is a network that routes information using either a network layer datagram protocol such as IP, a lower level protocol such as ATM, or both.

3. A method in accordance with claim 1 wherein said step of establishing said second call includes placing said first call on hold.

4. A method in accordance with claim 1 wherein said step of establishing said second call includes connecting to said third communication device through a PCM conference bridge using H.323 umbrella standards that define conferencing over packet-based networks and an ITU G.711 standard that defines transmission of PCM traffic over an IP network.

5. A method in accordance with claim 1 wherein said converting step includes converting said first call to G.711 speech coding using H.323 procedures while said first call is on hold.

6. A method in accordance with claim 1 wherein said combining step includes bridging said first, second, and third communication devices using said conference circuit and G.711 standards.

7. A method in accordance with claim 6 wherein said combining step includes wireless-to-PCM vocoding of said first call between said first wireless communication device and said conference circuit after said bridging is complete.

8. A method in accordance with claim 7 wherein said combining step includes wireless-to-PCM vocoding of said first call between said first wireless communication device and said conference circuit and between said second communication device and said conference circuit after said bridging is complete.

9. In a telecommunication system routing wireless-specific digital frames from a first wireless communication device in a wireless network across a data-oriented network for information delivery to a second communication device, a system for implementing multiparty conferencing, comprising:

means for establishing a first call between the first wireless communication device and the second communication device using a wireless-specific digital frame transmission mode to communicate across said data-oriented network;

means for establishing a second call between the first wireless communication device and a third communication device using a PCM frame transmission mode to communicate across said data-oriented network;

a conference circuit;

means for routing said first and second calls through a conference circuit;

means for converting said first call from said wireless-specific frame transmission mode to said PCM frame transmission mode for communication through said conference circuit; and means for combining said first call and said second call in said conference circuit to effect conferencing.

10. A system in accordance with claim 9 wherein said means for establishing said first call includes a data-oriented network that routes information using either a network layer datagram protocol such as IP, a lower level protocol such as ATM, or both.

11. A system in accordance with claim 9 wherein said means for establishing said second call includes means for placing said first call on hold.

12. A system in accordance with claim 9 wherein said means for establishing said second call includes means for connecting to said third communication device through a PCM conference bridge using H.323 umbrella standards that define conferencing over packet-based networks and an ITU G.711 standard that defines transmission of PCM traffic over an IP network.

13. A system in accordance with claim 9 wherein said means for converting said first call includes means for converting said first call to G.711 speech coding using H.323 procedures while said first call is on hold.

14. A system in accordance with claim 9 wherein said means for combining includes means for bridging said first, second, and third communication devices using said conference circuit and G.711 standards.

15. A system in accordance with claim 14 wherein said means for combining includes means for performing wireless-to-PCM vocoding of said first call between said first wireless communication device and said conference circuit after said bridging is complete.

16. A system in accordance with claim 15 wherein said means for combining includes means for performing wireless-to-PCM vocoding of said first call between said first wireless communication device and said conference circuit and between said second communication device and said conference circuit after said bridging is complete.

17. In a telecommunication system routing wireless-specific digital frames from a first wireless communication device in a wireless network across a data-oriented network for information delivery to a second communication device, a method for implementing tone generation functionality on behalf of the first wireless communication device, comprising the steps of:

sensing a tone generation input at said first wireless communication device;

generating a tone generation signal in response to said tone generation event;

transporting said tone generation signal over said data-oriented network for delivery to said second communication device;

generating a tone corresponding to said tone generation event following said transporting step and in response to said tone generation signal; and providing said generated tone to said second communication device.

18. A method in accordance with claim 17 wherein said step of sensing said tone generation input includes recognizing said tone generation input at a base station linked by radio control to said first wireless communication device when said first wireless communication device and said second communication device operate according to standards other than the Global System for Mobile Communication (GSM).

19. A method in accordance with claim 17 wherein said step of sensing said tone generation input includes recognizing said tone generation input at said first wireless communication device when said first wireless communication device and said second communication device operate according to the GSM standard.

20. A method in accordance with claim 17 wherein said step of generating said tone generation signal includes generating said signal at a base station linked by radio control to said first wireless communication device when said first wireless communication device and said second communication device operate according to standards other than GSM.

21. A method in accordance with claim 17 wherein said step of generating said tone generation signal includes generating said signal at said first wireless communication device when said first wireless communication device and said second communication device operate according to the GSM standard.

22. A method in accordance with claim 17 wherein said step of generating said tone generation signal includes generating a signaling message for transport over said data-oriented network.

23. A method in accordance with claim 17 wherein said tone generation step includes generating a tone at a terminating gateway component that receives said wireless-specific digital frames from said data-oriented network, converts said frames to PCM voice frames, and transmits said converted frames to said second communication device.

24. A method in accordance with claim 17 wherein said transporting step includes sending a signaling message to a terminating gateway vocoder as one or more data-oriented network packets.

25. A method in accordance with claim 17 wherein said step of generating said tone includes generating a full rate DTMF tone at said terminating gateway component.

26. In a telecommunication system routing wireless-specific digital frames from a first wireless communication device in a wireless network across a data-oriented network for information delivery to a second communication device, a system for implementing tone generation functionality on behalf of the first wireless communication device, comprising:

means for sensing a tone generation input at said first wireless communication device;

means for generating a tone generation signal in response to said tone generation event;

means for transporting said tone generation signal over said data-oriented network for delivery to said second communication device;

means for generating a tone corresponding to said tone generation event following transport of said tone generation signal by said transporting means and in response to said tone generation signal; and means for providing said generated tone to said second communication device.

27. A system in accordance with claim 26 wherein said means for sensing said tone generation input includes means for recognizing said tone generation input at a base station linked by radio control to said first wireless communication device when said first wireless communication device and said second communication device operate according to standards other than GSM.

28. A system in accordance with claim 26 wherein said means for sensing said tone generation input includes means for recognizing said tone generation input at said first wireless communication device when said first wireless conmmunication device and said second communication device operate according to the GSM standard.

29. A system in accordance with claim 26 wherein said means for generating said tone generation signal includes means for generating said signal at a base station linked by radio control to said first wireless communication device when said first wireless communication device and said second communication device operate according to standards other than GSM.

30. A system in accordance with claim 26 wherein said means for generating said tone generation signal includes means for generating said signal at said first wireless communication device when said first wireless communication device and said second communication device operate according to the GSM standard.

31. A system in accordance with claim 26 wherein said means for generating said tone generation signal includes means for generating a signaling message for transport over said data-oriented network.

32. A system in accordance with claim 26 wherein said means for generating said tone includes means for generating a tone at a terminating gateway component that receives said wireless-specific digital frames from said data-oriented network, converts said frames to PCM voice frames, and transmits said converted frames to said second communication device.

33. A system in accordance with claim 26 wherein said means for transporting includes means for sending a signaling message to a terminating gateway vocoder as one or more data-oriented network packets.

34. A system in accordance with claim 26 wherein said means for generating said tone includes means for generating a full rate DTMF tone at said terminating gateway component.

35. In a telecommunication system routing wireless-specific digital frames from a first wireless communication device in a wireless network across a data-oriented network for information delivery to a second communication device, a method for providing tones and announcements to the first wireless communication device, comprising the steps of:

receiving a signal requiring a tone or announcement to be sent to said first wireless communication device;

generating a wireless-specific tone or announcement frame in response to said signal;

transporting said wireless-specific tone or announcement frame to said first wireless communication device;

generating a tone or announcement at said first wireless communication device in response to said tone or announcement frame.

36. A method in accordance with claim 35 wherein said step of receiving said signal includes receiving said signal through a local wireless/data signaling gateway if packet-based feature control is provided by a local ECP.

37. A method in accordance with claim 35 wherein said step of receiving said signal includes receiving said signal at a local data network feature server if packet-based feature control is provided by said local data network feature server.

38. A method in accordance with claim 35 wherein said step of generating said wireless-specific tone or announcement frame includes retrieving a wireless-encoded version of said tone or announcement from a database within a local packet-based resource server.

39. A method in accordance with claim 35 wherein said transporting step includes sending said wireless-specific tone or announcement frame from a local packet-based resource server to said first wireless communication device.

40. A method in accordance with claim 35 wherein said step of generating said tone or announcement includes generating said tone or announcement in a vocoder associated with said first wireless communication device.

41. In a telecommunication system routing wireless-specific digital frames from a first wireless communication device in a wireless network across a data-oriented network for information delivery to a second communication device, a system for providing tones and announcements to the first wireless communication device, comprising:

means for receiving a signal requiring a tone or announcement to be sent to said first wireless communication device;

means for generating a wireless-specific tone or announcement frame in response to said signal;

means for transporting said wireless-specific tone or announcement frame to said first wireless communication device; and means for generating a tone or announcement at said first wireless communication device in response to said tone or announcement frame.

42. A system in accordance with claim 41 wherein said means for receiving said signal includes a local wireless/data signaling gateway if packet-based feature control is provided by a local ECP.

43. A system in accordance with claim 41 wherein said means for receiving said signal includes a local data network feature server if packet-based feature control is provided by said local data network feature server.

44. A system in accordance with claim 41 wherein said means for generating said wireless-specific tone or announcement frame includes means for retrieving a wireless-encoded version of said tone or announcement from a database within a local packet-based resource server.

45. A system in accordance with claim 41 wherein said means for transporting includes means for sending said wireless-specific tone or announcement frame from a local packet-based resource server to said first wireless communication device.

46. A system in accordance with claim 41 wherein said means for generating said tone or announcement includes means for generating said tone or announcement in a vocoder associated with said first wireless communication device.

* * * * *